G. F. DANIELSON.
HARROW TOOTH CLIP.
APPLICATION FILED MAR. 9, 1911.
992,941.
Patented May 23, 1911.
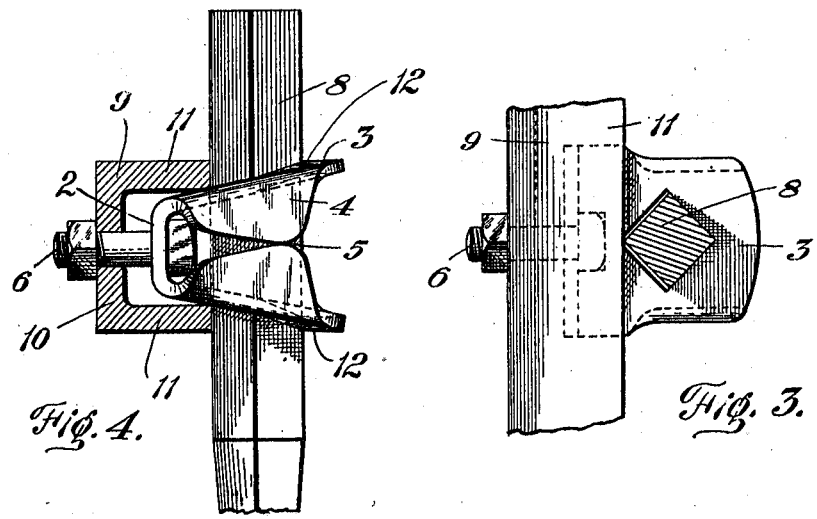
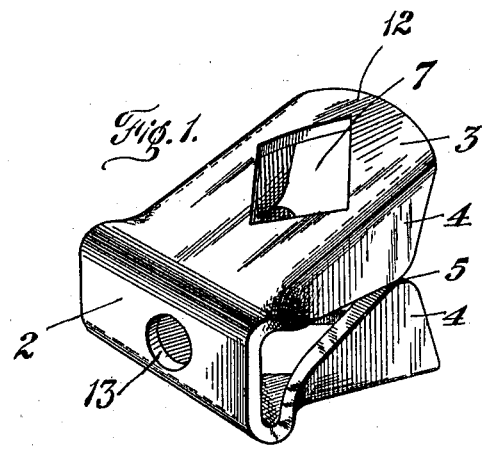
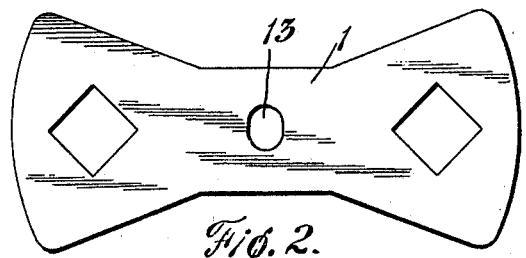
Witnesses
Chas. W. Stauffiger
Anna C. Raviler
Inventor
Gustave F Danielson.
By
Attorneys.

UNITED STATES PATENT OFFICE.

GUSTAVE F. DANIELSON, OF YOUNGSTOWN, OHIO.

HARROW-TOOTH CLIP.

992,941. Specification of Letters Patent. Patented May 23, 1911.

Application filed March 9, 1911. Serial No. 613,395.

*To all whom it may concern:*

Be it known that I, GUSTAVE F. DANIELSON, a citizen of the United States of America, residing at Youngstown, in the county of Mahoning and State of Ohio, have invented certain new and useful Improvements in Harrow-Tooth Clips, of which the following is a specification, reference being had therein to the accompanying drawings.

This invention relates to clips for securing harrow teeth in place, and more especially to an arrangement of the device whereby a tooth to which it is applied is rigidly held, the construction of the clip being such that it can be manufactured cheaply in larger quantities.

The invention consists in the matters hereinafter set forth and more particularly pointed out in the appended claims.

In the drawings, Figure 1 is a view in perspective of a clip embodying the invention; Fig. 2 is a plan view of a blank from which the clip is formed; Fig. 3 is a plan view of a clip applied to a harrow frame member, together with a portion of the latter; and Fig. 4 is a view in side elevation of the clip with the harrow frame member in cross-section.

As herein indicated in preferred form, a clip is formed of a blank 1 of sheet metal, or malleable iron, bent transversely between its ends along parallel lines to form a central shank 2 with slightly divergent arms 3, marginal portions or wings 4 of each arm being inturned into parallel planes transverse to both the shank and arms with abutting corners 5 which are preferably slightly rounded. The shank is centrally apertured for a clamping bolt 6 and openings 7 in the arms in alined relation are adapted to receive a harrow tooth 8.

The clip is used preferably in combination with a harrow frame member 9 of U-shaped or channel section, the clamping bolt 6 passing through the upright web 10 of the bar between whose flanges 11 the shank of the clip is inserted, the parts being so proportioned that the flanges contact with the clip and prevent its opening. Furthermore, the clip arms beyond the tooth apertures 7 are preferably outpressed along their longitudinal axes so that the portions indicated at 12 are widely separated and thereby bring the points of contact with the tooth squarely in line with the flanges 11 of the bar. The aperture 13 for the bolt 6 is also slightly elongated in the blank, to draw into proper circular shape when the blank is formed up. If the harrow tooth is rectangular in cross section, as is usual, the openings 7, which correspond in contour to the shape of the teeth, are arranged to hold one angle or corner of the tooth against the margins of the member flange and thereby draw the tooth more readily to seat.

The abutting portions of the wings prevent the arms of the clip from drawing together when the bolt is set up, and the divergency of the arms (together with the outpressing of their outer portions) increases the distance between the points of contact with the tooth and thereby holds the latter very firmly. While herein shown of sheet metal the blank may be of malleable iron, brass, or the like.

Obviously changes in the details of construction may be made without departing from the spirit of the invention and I do not wish to limit myself to any particular form or arrangement of parts.

What I claim is:

1. A harrow tooth clip comprising a blank folded transversely into a pair of arms connected at one end by a shank lying in a plane transverse to the arms and held in spaced relation near the free ends by inbent marginal wings in abutment, the arms having alined tooth holding openings, and a securing member passing through an opening in the shank.

2. A harrow tooth clip comprising a blank bent transversely between its widened ends to form slightly divergent arms connected by a shank lying in a plane transverse thereto, each arm being bent transversely along parallel lines, the resultant inbent marginal portions forming wings abutting with the wings of the companion arm, and the arms having tooth holding openings, and a securing member passing through an opening in the shank.

3. The combination with a harrow frame member having a pair of longitudinal flanges, and a harrow tooth, of a clip consisting of a blank folded into arms connected at one end by a transversely disposed shank and held in spaced relation near the other end by inbent marginal wings in abutment, the arms having alined apertures for holding the tooth, and a securing member passing through apertures in the shank and in the frame member.

4. The combination with a frame member having marginal flanges and a harrow tooth disposed transversely thereto, of a clip consisting of a blank bent transversely between its ends on parallel lines to form slightly divergent arms, the widened ends of the latter being held in spaced relation by inbent, abutting marginal wings and being provided with openings through which the tooth passes in contact with the margins of the member flanges, and a bolt passing through the shank and member between the flanges of the latter.

5. The combination with a frame member having marginal flanges and a harrow tooth disposed transversely thereto, of a clip consisting of a blank bent transversely between its ends on parallel lines to form slightly divergent arms, the widened ends of the latter being held in spaced relation by inbent, abutting marginal wings and being provided with openings through which the tooth passes in contact with the margins of the member flanges, and a bolt passing through the shank and member between the flanges of the latter, the arms being centrally outbent beyond the openings for the tooth.

6. A harrow tooth clip comprising a blank bent transversely between its widened ends to form slightly divergent arms connected by a shank lying in a plane transverse thereto and having an opening elongated transversely to the shank, each arm being bent transversely along parallel lines, the resultant inbent marginal portions forming wings abutting with the wings of the companion arm, and the arms having tooth holding openings, and a securing member passing through the opening in the shank, the arms being centrally outbent beyond the openings for the tooth.

In testimony whereof I affix my signature in presence of two witnesses.

GUSTAVE F. DANIELSON.

Witnesses:
OTTO F. BARTHEL,
ANNA C. RAVILER.

---

Copies of this patent may be obtained for five cents each, by addressing the "Commissioner of Patents, Washington, D. C."